Jan. 9, 1968 W. V. TAYLOR 3,362,157
GAS TURBINE ENGINE WITH ROTARY REGENERATOR AND
ROTATING CONSTANT VOLUME COMBUSTION CHAMBERS
Filed Sept. 28, 1966 2 Sheets-Sheet 1

INVENTOR.
WESLEY V. TAYLOR
BY
Arthur L. Collins
ATTORNEY

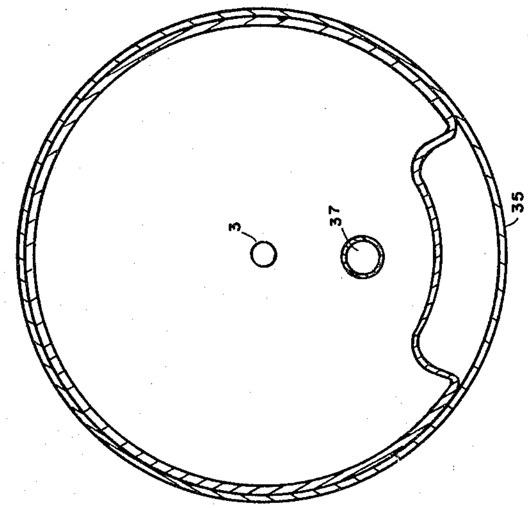
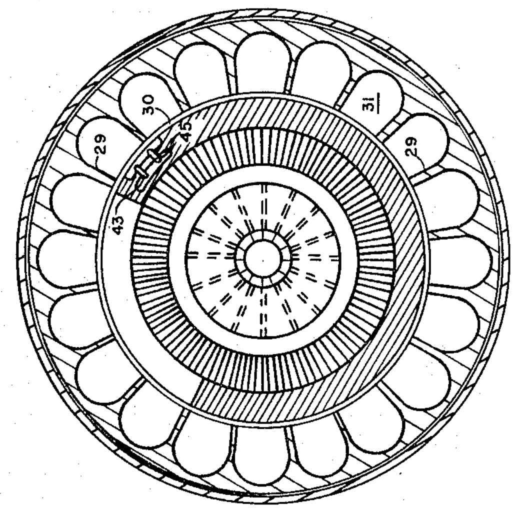
INVENTOR.
WESLEY V. TAYLOR
BY
Arthur L. Collins
ATTORNEY

United States Patent Office 3,362,157

Patented Jan. 9, 1968

3,362,157

GAS TURBINE ENGINE WITH ROTARY REGENERATOR AND ROTATING CONSTANT VOLUME COMBUSTION CHAMBERS

Wesley V. Taylor, Wayne, Pa., assignor to the United States of America as represented by the Secretary of the Navy Filed Sept. 28, 1966, Ser. No. 583,122
7 Claims. (Cl. 60—39.34)

ABSTRACT OF THE DISCLOSURE

A gas turbine engine having a rotary matrix regenerator and a rotor including constant volume combustion chambers. The regenerator and rotor are geared to the turbine drive shaft through reduction gearing.

The invention described herein may be manufactured and used by or for the Government of the United States of America for governmental purposes without the payment of any royalties thereon or therefor.

The present invention relates to a novel and improved power plant or engine and more particularly to a novel and improved regenerative constant volume combustion gas turbine engine.

Various types of power plants and engines are presently in common use but none exhibit a particularly high degree of efficiency. Efficiency of the internal combustion engine, which operates on the basic Otto cycle, is enhanced by its constant volume combustion characteristic and by the cooling effect of each charge of fresh inlet air which permits high cycle operating engine temperatures. However, the efficiency of the Otto cycle engine is also substantially diminished due to high heat loss in the exhaust portion of the cycle. Regeneration to recover some of the exhaust heat energy is not feasible due to the configuration of the engine in which all processes of the cycle are confined within the combustion chamber. Similarly, although exhaust heat that might otherwise be wasted can be regenerated in the separate compressor of a Brayton cycle gas turbine engine, the efficiency of the Brayton cycle engine is substantially reduced since the continuous combustion therein limits operating engine temperatures.

It is therefore a principal object of the present invention to provide a novel and improved power plant or engine which incorporates features of Otto and Brayton cycle engines that enhance its over-all efficiency.

It is a further object of the present invention to provide a novel and improved constant volume combustion engine in which heat energy of exhaust gases are regenerated.

It is a further object of the present invention to provide a novel and improved gas turbine engine that operates at improved high cycle temperatures.

Other objects and many of the attendant advantages of this invention will be readily appreciated as the same becomes better understood by reference to the following detailed description when considered in connection with the accompanying drawing wherein:

FIG. 2 is a sectional view taken along line 2—2 of FIG. 1; and

FIG. 3 is a sectional view taken along line 3—3 of FIG. 1.

Figure 1:
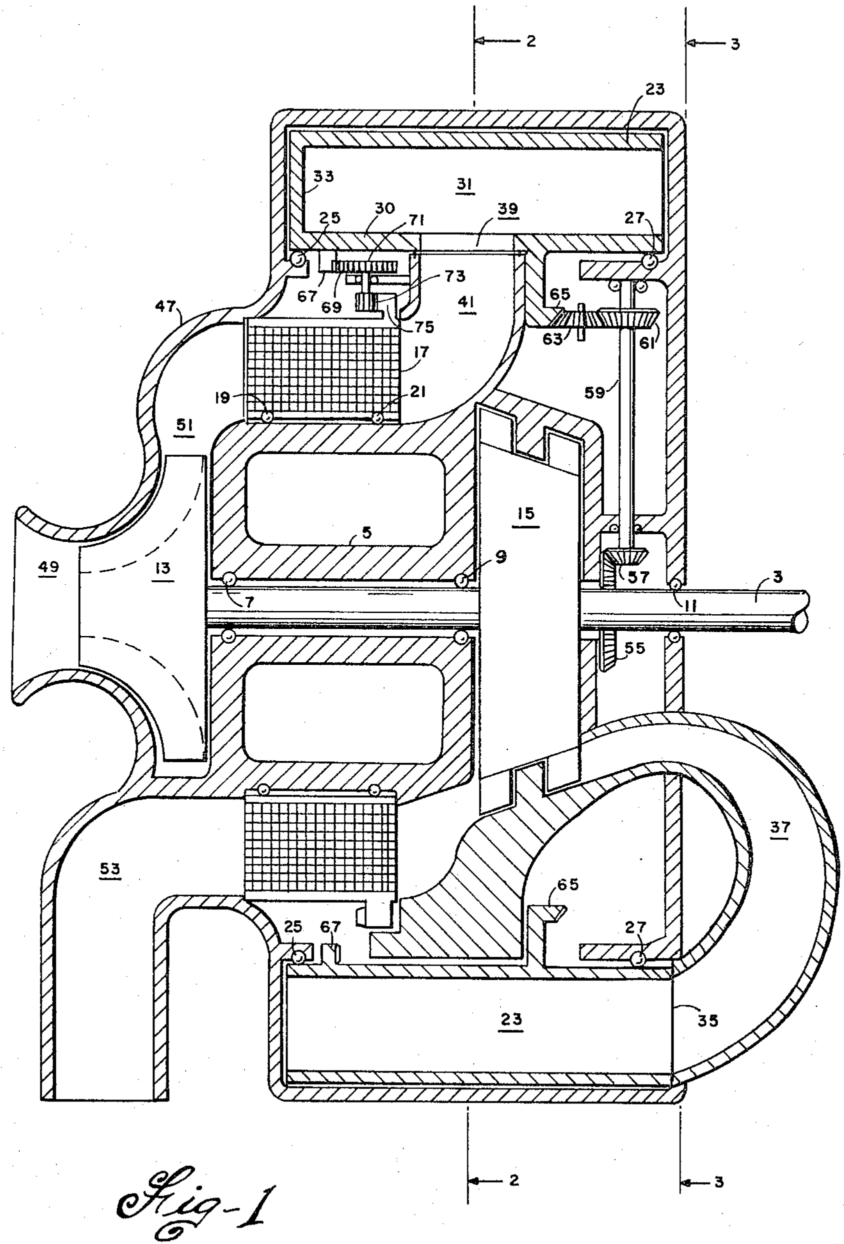
FIG. 1 is a cross-sectional view of a preferred embodiment of the present invention.

Referring now to the various figures of the drawing, it will be noted that the power output shaft 3 of the improved constant volume turbine engine of the invention is supported on the engine frame 5 on suitable bearings 7, 9 and 11. The radial flow centrifugal compressor 13 and turbine 15 are affixed to shaft 3 for rotation therewith. The annular regenerator unit 17 is mounted as shown for rotation on the turbine engine frame 5 on conventional bearings 19 and 21. Inasmuch as the details of the regenerator per se form no part of the invention, the same are not included herein for the sake of simplicity. For a complete understanding of the invention, it need only be understood that the operative portion of the regenerator 17 is a porous complex of a readily heat exchangeable material such as a plurality of tightly compressed layers of annular metallic screens which are brazed or otherwise permanently secured one to another to form the desired annular unitary structure.

The annular rotor 23 is also mounted for rotation on the engine frame 5 on the conventional bearings 25 and 27. A plurality of walls or vanes 29 extend inwardly radially from the inner peripheral surface of the rotor 23. The inner radial extremities of walls or vanes 29 are interconnected by the cylindrical wall 30. The walls or vanes 29 and the cylindrical wall 30 of rotor 23 define a plurality of circumferentially spaced cylindrical combustion chambers 31 about the inner peripheral surface of the annular rotor. One end of the rotor 23 is preferably closed as at 33. The opposite end of the rotor is open so as to permit discharge of the combusted gases in the combustion chambers 31 through the elongated arcuate opening 35 in the engine frame 5 in a manner which will be more apparent hereinafter. The conduit 37 interconnects the elongated opening 35 in the engine frame 5 with the gas inlet opening of the turbine 15. A port or opening 39 is formed in the cylindrical wall 30 between each wall or vane 29 of the rotor 23 that separates one combustion chamber from another. In this way, as will also be more apparent hereinafter, air or gas from the regenerator 17 may be conducted through conduit 41 and through the elongated arcuate opening 39 in the engine frame 5 into the various combustion chambers of the rotor 23. The fuel injection device 43, which is connected to any suitable fuel supply source not shown on the drawing and the ignition device 45 are disposed in the engine frame 5 so as to inject a predetermined amount of fuel through the port or opening 39 of each combustion chamber and ignite the same after the rotor 23 passes the elongated arcuate opening 39 in the frame 5.

The engine casing 47 surrounds the compressor 13, the turbine 15, the regenerator 17, and the rotor 23 and together with various portions of the engine frame 5 defines the axial air or gas inlet duct 49 into the engine, the conduit 51 from the compressor 13 to the regenerator 17 and the air or gas outlet 53 to the atmosphere.

The beveled gear 55 which is keyed or otherwise secured to the output shaft 3 engages the complementarily beveled gear 57 on the rotor drive shaft 59. The beveled gear 61 fixed to shaft 59, in turn, drives the rotor 23 through beveled gear 63 and the annular toothed portion 65 of the rotor 23. The toothed portion 67 of rotor 23 similarly engages the gear 69 which is affixed to the regenerator drive shaft 71. The gear 73 which is also affixed to the regenerator drive shaft 71 drives the regenerator assembly 17 as it engages the toothed annular projecting portion 75 of the regenerator 17. The various gears and mechanical linkages between the main output shaft 3, the rotor unit 23 and the regenerator assembly 17 are proportioned and designed such that when the output shaft 3 rotates at 38,000 r.p.m., the angular velocity of the rotor 23 is preferably approximately 2000 r.p.m. and the angular velocity of the regenerator assembly 17 is preferably approximately 50 to 100 r.p.m.

In operation, air from the atmosphere is drawn into the axial air inlet duct 49 and compressed by the centrifugal compressor 13. The compressed air is then directed through the core of the rotating regenerator 17 where the air is heated by the exhaust gases from the turbine 15 in a manner which will be more apparent hereinafter. The heated compressor discharge air is then directed into the combustion chambers 31 of rotor 23 through conduit 41 and the elongated opening 39 in the engine frame 5. Rotary movement of rotor 23 seals off each combustion chamber 31 after it has been charged with the heated and compressed air from compressor 13 and regenerator 17. Fuel is then injected into the combustion chambers 31 and ignited by the fuel injection device 43 and the ignition device 45. Air fuel mixtures are adjusted according to engine power requirements in any suitable conventional manner. After initial ignition, the ignitor 45 is not required since burning in the ignitor chamber will sustain combustion as subsequent combustion chambers rotate into position. Combustion in the various combustion chambers then occurs under constant volume conditions. After constant volume combustion, the chambers 31 rotate into alignment with the opening 35 in frame 5 and the conduit 37 to turbine 15. Although the elongated opening 35 and the single conduit 37 are shown in the drawing connecting the rotor chambers 31 to the turbine 15, it is to be understood that a plurality of conduits could be used without departing from spirit or scope of the invention. The combusted gases in passing through the turbine 15 drive the turbine 15 and compressor 13 as well as the load applied to output shaft 3. After leaving the turbine, waste exhaust heat of the combusted gases is recovered in the rotating regenerator 17 and is subsequentially utilized to increase the temperature and energy of the compressed air that is directed into the combustion chambers 31 at the top of the cycle of rotor 23. The rotor 23 is driven by the output shaft 3 through various interconnecting gears and linkages at a reduced angular velocity that is compatible with the design of the engine. Similarly, regenerator 17 is driven by output shaft 3 and rotor 23 at a still further reduced angular velocity to provide suitable dwell time for the regenerator 17 to efficiently impart and absorb heat to and from the incoming and exhaust air and gases.

Obviously, many modifications and variations of the present invention are possible in the light of the above teachings. It is therefore to be understood that within the scope of the appended claims, the invention may be practiced otherwise than as specifically described.

What is claimed is:

1. A constant volume gas turbine engine comprising:

(a) an output shaft;

(b) a radial flow centrifugal compressor mounted on the shaft;

(c) a radial flow turbine also mounted on the shaft;

(d) a casing which surrounds the compressor and the turbine and provides gas inlet into the compressor, stators for the compressor and the turbine and a gas outlet from the turbine;

(e) a regenerator mounted for rotation within the casing such that gas from the compressor passes therethrough on one side of the casing and gas from the turbine passes therethrough on the other side of the casing;

(f) and a rotor which includes a plurality of circumferentially spaced combustion chambers and which is mounted for rotation within the casing such that as the rotor turns, gas from the regenerator on the one side of the casing passes sequentially into the combustion chambers and gas from the combustion chambers on the other side of the casing passes into the turbine.

2. The constant volume gas turbine engine substantially as described in claim 1 and further comprising means coupled to the shaft for driving the rotor at a speed that is a predetermined reduced proportion of the speed of the shaft.

3. The constant volume gas turbine engine substantially as described in claim 2 and further comprising means coupled to the rotor for driving the regenerator at a speed that is a predetermined reduced proportion of the speed of the rotor.

4. The constant volume gas turbine engine substantially as described in claim 1 and further comprising means for maintaining constant volume combustion in each combustion chamber during a predetermined portion of the interval required for the rotor to rotate from said one side of the casing to the said other side of the casing.

5. The constant volume gas turbine engine substantially as described in claim 2 and further comprising means for maintaining constant volume combustion in each combustion chamber during a predetermined portion of the interval required for the rotor to rotate from said one side of the casing to the said other side of the casing.

6. The constant volume gas turbine engine substantially as described in claim 3 and further comprising means for maintaining constant volume combustion in each combustion chamber during a predetermined portion of the interval required for the rotor to rotate from said one side of the casing to the said other side of the casing.

7. The constant volume gas turbine engine substantially as described in claim 4 and further comprising means for injecting and igniting fuel in each combustion chamber during the said interval.

References Cited

UNITED STATES PATENTS

| | | | |
|---|---|---|---|
| 2,667,034 | 1/1954 | Alcock | 60—39.51 XR |
| 3,043,106 | 7/1962 | Coleman | 60—39.51 |
| 3,150,646 | 9/1964 | Bernard | 60—39.34 XR |
| 3,177,661 | 4/1965 | Hasbrouck et al. | 60—39.51 |

CARLTON R. CROYLE, *Primary Examiner.*